United States Patent [19]

Drake et al.

[11] Patent Number: 4,638,328

[45] Date of Patent: Jan. 20, 1987

[54] PRINTHEAD FOR AN INK JET PRINTER

[75] Inventors: Donald J. Drake, Rochester; William G. Hawkins; Roger G. Markham, both of Webster; Richard V. LaDonna, Fairport, all of N.Y.

[73] Assignee: Xerox Corporation, Stamford, Conn.

[21] Appl. No.: 858,143

[22] Filed: May 1, 1986

[51] Int. Cl.[4] .................................... G01D 15/18

[52] U.S. Cl. .................................... 346/75; 346/140 R

[58] Field of Search .................... 346/75, 140 R, 140 A

[56] References Cited

U.S. PATENT DOCUMENTS

| | | | |
|---|---|---|---|
| 3,731,876 | 5/1973 | Showalter | 239/13 |
| 3,790,703 | 2/1974 | Carley . | |
| 3,878,519 | 4/1975 | Eaton | 346/1 |
| 3,943,525 | 3/1976 | Skala | 346/1.1 |
| 4,128,345 | 12/1978 | Brady | 400/120 |
| 4,220,958 | 9/1980 | Crowley | 346/75 |
| 4,312,008 | 1/1982 | Taub et al. | 346/140 R |
| 4,338,611 | 7/1982 | Eida et al. | 346/75 |

FOREIGN PATENT DOCUMENTS

| | | |
|---|---|---|
| 2060499 | 5/1981 | United Kingdom . |
| 2072099 | 9/1981 | United Kingdom . |

*Primary Examiner*—E. A. Goldberg
*Assistant Examiner*—Gerald E. Preston
*Attorney, Agent, or Firm*—Robert A. Chittum

[57] ABSTRACT

A continuous stream type ink jet printhead utilizing constant thermal pulses to perturbate the ink streams emitted through a plurality of nozzles to break up the ink streams into droplets at a fixed distance from the nozzles whereat the drops are individually charged by a charging electrode in accordance with digitized data signals. Each printhead has a manifold, a plurality of ink channels communicating at one end with the manifold and terminating at the other end with nozzles, and at least one resistor addressed by a predetermined frequency of current pulses for applying thermal pulses to the ink. In one embodiment, a resistor is positioned in each of the channels adjacent the nozzles and in another embodiment, a single resistor is located in the ink manifold. The resistors are pulsed at low power to generate a perturbation of ink properties such as density, viscosity, or surface tension without producing a phase change in the ink.

11 Claims, 7 Drawing Figures

FIG. 2
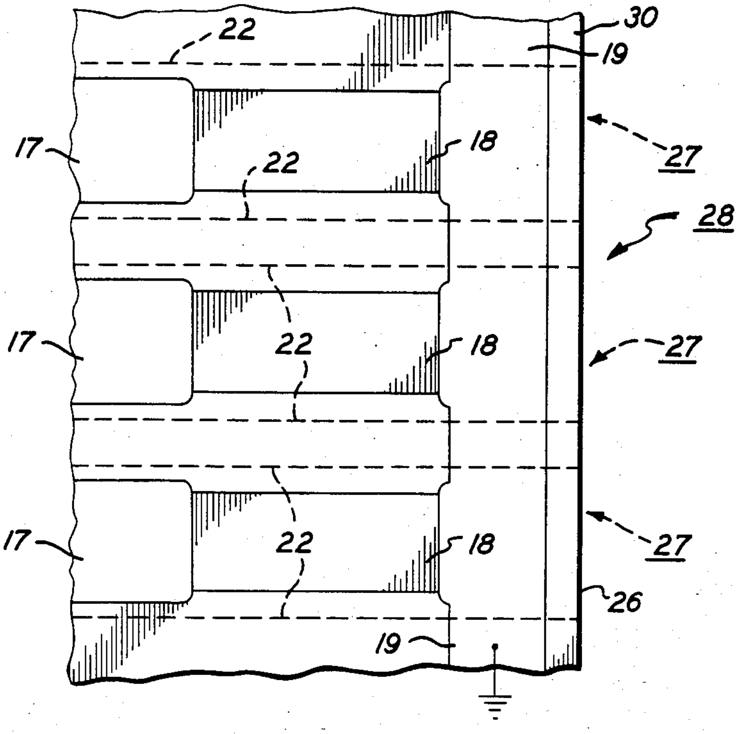
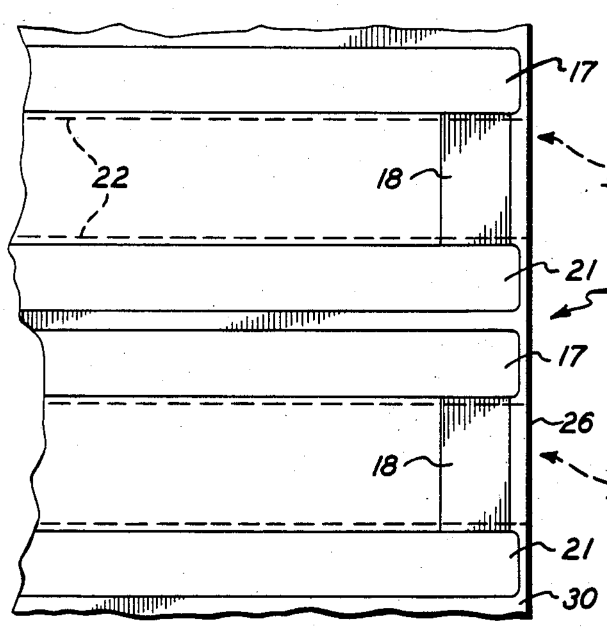
FIG. 3

PRINTHEAD FOR AN INK JET PRINTER

BACKGROUND OF THE INVENTION

1. Field of the Invention

This invention relates generally to continuous stream type ink jet printing systems and more particularly to printheads which stimulate the ink in the continuous stream type ink jet printers by thermal energy pulses.

2. Description of Prior Art

Ink jet printing systems are usually divided into two basic types, continuous stream and drop-on-demand. In continuous stream ink jet printing systems, ink is emitted in a continuous stream under pressure through one or more orifices or nozzles. The stream is perturbated, so that it is broken into droplets at a predetermined fixed distance from the nozzles. At the break up point, the droplets are charged in accordance with varying magnitudes of voltages representative of digitized data signals. The charged droplets are propelled through a fixed electrostatic field which adjusts or deflects the trajectory of each droplet in order to direct it to a specific location on a recording medium, such as paper, or to a gutter for collection and recirculation. In drop-on-demand ink jet printing systems, a droplet is expelled from a nozzle directly to the recording medium along a substantially straight trajectory, that is, substantially perpendicular to the recording medium. The droplet expulsion is in response to digital information signals and a droplet is not expelled unless it is to be placed on the recording medium. Except for periodic, concurrent expulsion of droplets from all nozzles into a receptacle to keep the ink menisci in the nozzles from drying, drop-on-demand systems require no ink recovering gutter to collect and recirculate the ink and no charging or deflection electrodes to guide the droplets to specific pixel locations on the recording medium. Thus, drop-on-demand systems are much simpler than the continuous stream type.

Generally, the ink in a continuous stream type ink jet printer is perturbated or stimulated by a piezoelectric device attached to the printhead so that regular pressure variations are imparted to the ink in the printhead manifold. The piezoelectric device is usually driven at a frequency in the range of 100 to 125 kHz. It is also known that the ink perturbations may be accomplished by electrohydrodynamic electrodes positioned at the printhead orifices and, as discussed in the patents below, certain forms of thermal energy pulses. When a continuous regular perturbation is impressed on the ink flowing through the small nozzles, the perturbation grows along the length of the stream. The optimum operating conditions are obtained when $\lambda$ divided by D is less than seven and greater than three, where D is the nozzle diameter and $\lambda$ is the perturbation wavelength. This perturbation results in stream breakup which produces discrete droplets at fixed distances from the nozzles. As mentioned above, the most common method of supplying this perturbation has been to generate pressure waves by using a piezoelectric material. Such material generates a plane wave that travels across an acoustically designed ink reservoir to reach a nozzle plate that contains the orifices or nozzles through which the streams of pressurized ink flows.

Some problems associated with the piezoelectric stimulated ink streams or jets are that it is difficult to achieve uniform nozzle drive in an array of jets because of the complex acoustic interactions of the pressure wave with the acoustic ink jet cavity or reservoirs of the droplet generators. However, stream breakoff length must be uniform so that all jets or streams must break off in the droplet charging electrodes which are at fixed distances from the nozzles. Also, fabrication of droplet generators may be expensive because of the cost of high precision machining of the acoustically designed reservoirs and very expensive materials. Such droplet generators tend to be heavy and bulky. In addition, the large fluid or ink inertia and potential for air bubble entrapment in the acoustic reservoir is a troublesome problem that must be addressed by such continuous stream printers during startup and shutdown of the ink streams. Several approaches to the solution of these problems are evident in the prior art as delineated below, but none have entirely solved them.

U.S. Pat. No. 3,731,876 to Showalter discloses method and apparatus for producing mist-like fluid sprays. The fluid to be sprayed is heated to a temperature where the vapor pressure of the fluid exceeds the pressure in the space into which it is to be sprayed, but is less than the opening pressure of the nozzle. When the fluid leaves the nozzle orifice, it boils instantly, making the effective viscosity and surface tension of the fluid in and past the spray orifice very small, whereby the fluid breaks up into extremely small drops.

U.S. Pat. No. 3,878,519 to Eaton discloses the selective application of heat energy to the ink stream emitted under pressure from a nozzle to reduce the surface tension of successive segments of the ink stream before the ink stream would randomly break up into droplets. Both the quantity of energy applied and the duration of the applied energy control the breakup point of the stream at predetermined distances from the nozzle. The source of heat may be high intensity light converted to heat energy by the ink stream or an annular or partially annular resistive heater positioned within the nozzle and at the nozzle orifice outer surface. The intense light energy is focused on the ink stream downstream from the nozzle.

U.S. Pat. No. 4,128,345 to Brady discloses a matrix printer which selectively applies fluid impulses onto a record medium. The printer comprises a sheet transport, a printhead, an ink supply, a valve assembly, and a data input system. The printhead includes an array of tubes connected to the ink supply and to the valve assembly. The valve assembly includes a separate valve for each tube for controlling the supply of ink thereto. In one embodiment, a heater raises the temperature of the ink passing through the tubes enough to effect printing whenever the ink is ejected from the tubes. In another embodiment, a movable pin is mounted at the distal end of each tube confronting the recording medium, so that it is driven into the recording medium when a valve is opened. In a further embodiment, the movable pins are heated enough to effect printing when the pins are driven into contact with the recording medium. The data input system opens and closes the valves in accordance with input signals such that the impulses of the ink applied to the tubes produce ink marks on the recording medium.

British Pat. No. 2,060,499 to Endo et al and assigned to Canon K.K., discloses an ink jet printhead in the typical thermal ink jet configuration modified from the drop-on-demand expulsion of ink droplets by the generation of instantaneous bubble generation and collapse by placing the ink under pressure to cause it to continually squirt from each nozzle in streams of ink. The ink streams are perturbated by the continuous addressing of the resistors in the ink channels near the nozzles by current pulses at predetermined frequencies to cause continuous, vigorous changes of state of the ink. That is, bubbles are continually produced and allowed to collapse at a sufficient frequency to stimulate the ink in each channel and to cause the ink streams emitted therefrom to break up into droplets at predetermined distances from the nozzles whereat voltages are applied to the droplets as they are formed.

Unfortunately, such printhead configuration used in the continuous stream operating mode causes dramatic reduction in heater lifetimes, consumes greater quantity of power when the bubble generation is required to perturbate the ink streams, and causes severe crosstalk between ink channels. By crosstalk, it is meant that the activation of the resistors in one nozzle produces an undesired effect on the droplet stream issuing from adjacent nozzles.

British Pat. No. 2,072,099 to Sugitani and assigned to Canon K.K., discloses an ink jet printhead and method of manufacture wherein grooves which constitute the ink flow paths or channels are formed in a layer of photosensitive composition placed on the surface of a substrate having the heating elements thereon. The channels are formed so that the heating elements are within the channels.

U.S. Pat. No. 4,220,958 to Crowley discloses a continuous stream type ink jet printer wherein the perturbation is accomplished by electrohydrodynamic (EHD) excitation. The EHD exciter is composed of one or more pump electrodes of a length equal to about one-half the droplet spacing. The multiple pump electrode embodiments are spaced at intervals of multiples of about one-half the droplet spacing or wavelength downstream from the nozzles.

SUMMARY OF THE INVENTION

It is the object of this invention to provide a printhead suitable for use in a continuous stream type ink jet printer that perturbates the ink by the application of thermal pulses applied within the printhead that do not cause the ink to change phases or states.

It is another object of this invention to provide a printhead for a continuous stream type ink jet printer that is more cost effective to manufacture by allowing the concurrent fabrication of large quantities of printheads or modular portions thereof from two substrates that are preferably silicon wafers.

In the present invention a printhead suitable for use in a continuous stream type ink jet printer is composed of two substrates that are mated and permanently bonded together. The substrates are preferably silicon and have parallel surfaces and at least one edge perpendicular to the parallel surfaces. The surface of one substrate contains at least one heating element together with an addressing electrode per heating element, and at least one return electrode. The other substrate contains in one surface thereof an etched recess and parallel grooves. One end of the grooves open into the recess and the other ends penetrate its substrate edge. The two substrates are mated such that the recess becomes an ink manifold and the grooves become ink channels. The groove openings in the substrate edge serves as the orifices or nozzles.

Alternatively, a photosensitive film may be placed on the substrate containing the heating element or elements and patterned to form the ink channels, each of which terminate with an opening at the substrate edge. The other substrate contains the reservoir for supplying ink to the channels. In this alternate embodiment, the photosensitive film containing the channels is sandwiched between the two substrates.

Means are provided to fill the reservoir or manifold and thus the channels with ink. During the printing mode, the ink is pressurized causing streams of ink to flow from the orifices. Circuit means applies regular pulses of current to the addressing electrode and thus to the heating element causing pulses of thermal energy to be transferred to the ink thereby producing regular periodic changes in density, viscosity, and surface tension in the ink contacting the heating element and perturbating or stimulating the ink. Thermal expansion of the ink (i.e., density change) is sufficient to produce a positive pressure pulse that causes stable breakup of a continuous ink stream. A thermal pulse is also known to decrease the viscosity of the ink near the resistor or heating element, thus perturbing the fluid boundary layer. It is also known from the prior art mentioned above that thermal pulses can change the surface tension of the ink streams. Each of these mechanisms is sufficient to generate droplets stably. This thermal stimulation of ink thus causes the ink streams to break up into droplets at a predetermined distance from the orifices whereat charging electrodes induce charges on the droplets as they are formed in accordance with digitized or video signal. The variably charged droplets are deflected to particular trajectories as they travel through a stationary electrostatic field to specific pixel locations on a moving recording medium or to a gutter for recirculation. The current pulses are sufficiently low to prevent vaporization of the ink. In one embodiment, a single heating element is located in the printhead manifold and in another embodiment, the heating elements are located adjacent each of the orifices but upstream thereof. Each heating element has its own addressing electrode and return electrodes both of which are outside of the manifold and channels, and the channels have the same internal width and length as the heating elements.

A more complete understanding of the present invention can be obtained by considering the following detailed description in conjunction with the accompanying drawings.

BRIEF DESCRIPTION OF THE DRAWINGS

FIG. 2 is a partial view of the printhead as viewed along view line A—A of FIG. 1;

FIG. 3 is similar to FIG. 2, but shows an alternate embodiment of the present invention;

While the present invention will be described hereinafter in connection with preferred embodiments thereof, it will be understood that is not intended to limit the invention to those embodiments on the contrary, it is intended to cover all alterntives, modifications and equivalents as may be included within the spirit and scope of the invention as defined by the appended claims.

DESCRIPTION OF THE PREFERRED EMBODIMENT

Figure 1:
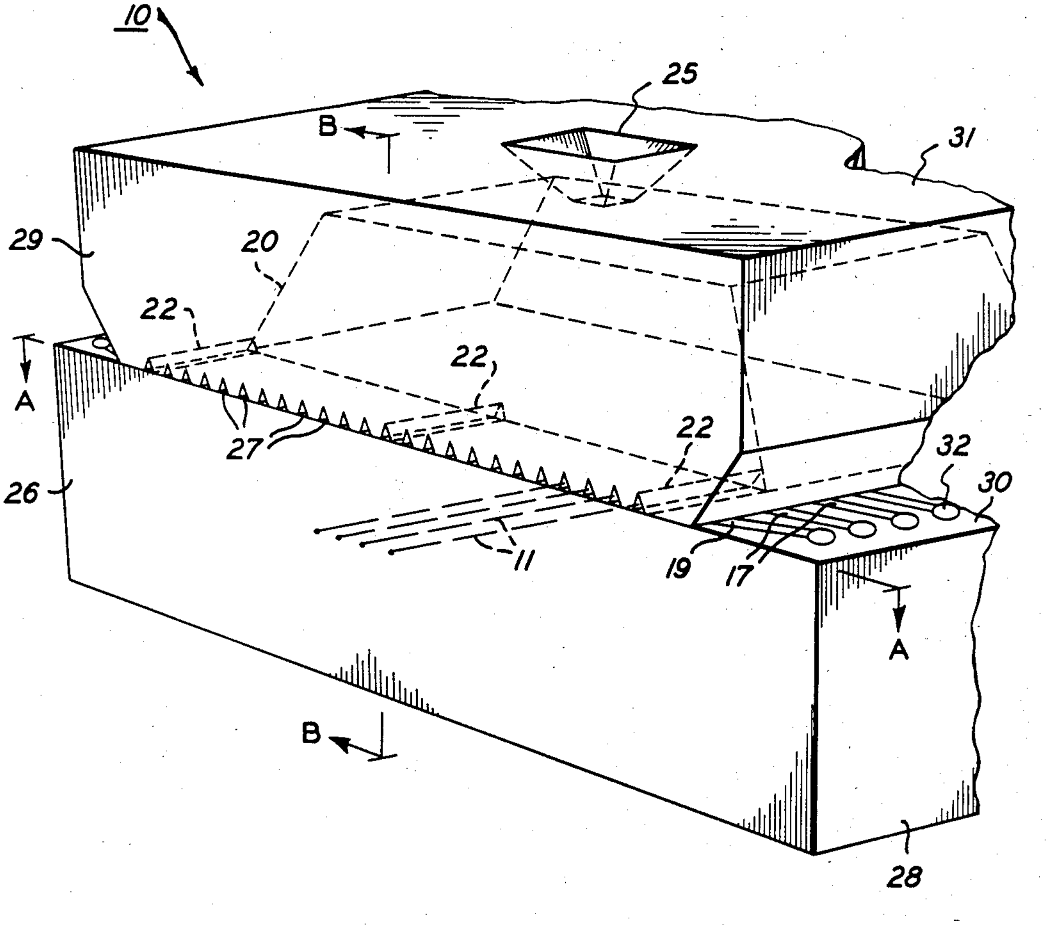
FIG. 1 is a schematic, partial isometric view of the printhead of the present invention.

In FIG. 1, a schematic representation of the printhead 10 of the present invention is partially shown in isometric view with the streams 11 of pressurized ink emitted from orifices or nozzles 27. The ink streams are depicted as dashed lines. The printhead comprises a channel plate or substrate 31 permanently bonded to heater plate or substrate 28. The material of both substrates is silicon in the preferred embodiment because of their low cost, bulk manufacturing capability as discloed in U.S. patent application Ser. No. 719,410, filed Apr. 3, 1985 to Hawkins et al and assigned to the same assignee as the present invention. Channel plate 31 contains an etched recess 20, shown in dashed line, in one surface which, when mated to the heater plate 28, forms an ink reservoir or manifold. A plurality of identical parallel grooves 22, shown in dashed lines and having triangular cross-sections, are etched in the same surface of the channel plate with one of the ends thereof penetrating edge 29 of the channel plate. The other ends of the grooves open into the recess or manifold 20. When the channel plate and heater plate are mated, the groove penetrations through edge 29 produce the orifices 27 and the grooves 22 serve as ink channels which connect the manifold with the orifices. Opening 25 in the channel plate provides means for maintaining a supply of pressurized ink in the manifold from an ink supply source (not shown).

Since the present invention concerns only the printhead, the details of the remainder of the continuous stream type ink jet printer are not discussed herein. For a description thereof, reference may be had to U.S. Pat. No. 4,395,716 granted July 26, 1983, and to U.S. Pat. No. 4,255,754, granted Mar. 10, 1981, both to Crean et al.

FIG. 2 is an enlarged cross sectional view of a portion of the printhead as viewed along view line A—A of FIG. 1. This view is essentially a plan view of a portion of the heater plate 28, showing the heater plate surface 30 with the heating elements or resistors 18, individual addressing electrodes 17, and common return electrode 19. First, the resistors are patterned on the surface 30 of the heater plate 28, one for each ink channel in a manner described by the above mentioned patent application to Hawkins et al, and then the electrodes 17 and common return electrode 19 are deposited thereon. The addressing electrodes and return electrode connect to terminals 32 near the edges of the heater plate, except for the edge 26 which is coplanar with the channel plate edge 29 containing the orifices 27 (see FIG. 1). All of the addressing electrode terminals concurrently receive current pulses at a predetermined frequency to generate continual thermal pulses that are transferred to the ink flowing through the channels above the electrodes and heating elements or heaters. Referring back to FIG. 2, the grounded common return 19 necessarily spaces the heating element 18 from the heater plate edge 26 and thus the orfiices 17. The addressing electrodes and heating elements are both within the ink channels, requiring pinhole free passivation wherever the ink might contact them. This configuration is substantially the same as that disclosed in the above-mentioned U.S. patent application to Hawkins et al which describes a thermal or bubble jet ink jet printer and method of manufacture. The major difference between this invention and the Hawkins et al patent application is that the ink supply is pressurized and the ink is never vaporized by the current pulses applied to the heating elements. Thermal ink jet printers are of the drop-on-demand type and vapor bubbles are generated whenever a droplet of ink is to be expelled. In the continuous stream type ink jet, of course, the ink is always, during the printing operation, flowing through the orifices in streams and the ink is perturbed to cause it to break up into droplets at a particular distance from the nozzles whereat the fixed charging electrodes are placed.

FIG. 3 is the same view of the printhead as FIG. 2, except that it depicts an alternate embodiment. In this alternate embodiment, the heating elements 18 are positioned nearer to the heater plate edge 26 and each heating element or resistor 18 has an individual grounded return electrode 21 as well as an individual addressing electrode 17. The ink channels 22, shown in dashed line, are spaced apart so that only the heating element is exposed to the pressurized ink flowing through the orifices 27. The electrode passivation may be omitted since the channel plate 31 and adhesive bonding it to the heater plate 28 prevents the ink from contacting the electrodes 17 and 21. If the electrodes are optionally passivated, the integrity of the passivation layer is much less important because the ink does not contact them and a few pin holes will not shorten the printhead's operating life. The penalty for this advantage of moving the heating element closer to the orifices and placing the electrode outside the ink flow paths is that the geometric spacing must be sacrificed. That is, the channels 22 must be further apart. This would be detrimental to a thermal ink jet printer, but not a continuous stream ink jet printer, for each stream is responsible for printing a segment of a line containing many pixels rather than just one pixel from each orifice as is required in thermal ink jet printers.

Figure 4:
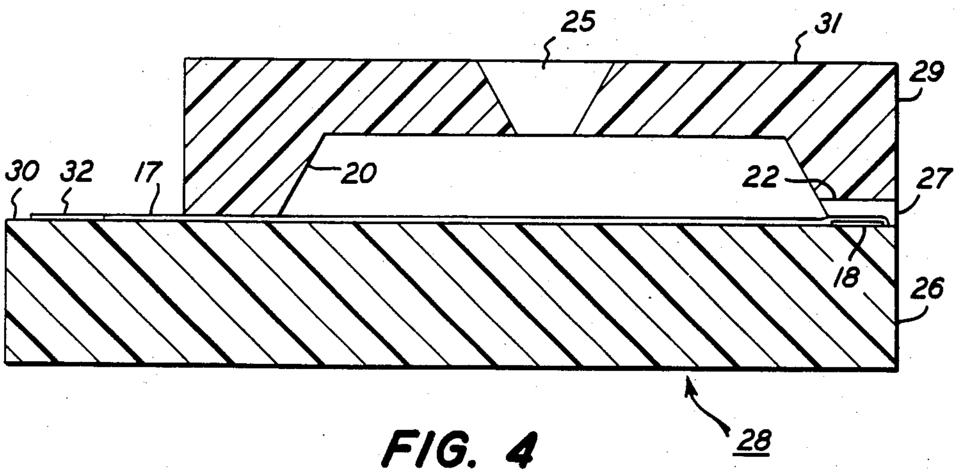
FIG. 4 is the alternate embodiment of FIG. 3 as viewed along view line B—B of FIG. 1.

FIG. 4 is a cross sectional view of the embodiment in FIG. 3 and is the view indicated by view line B—B of FIG. 1. In this FIG. 4, the heater plate 28 contains on surface 30 thereof a plurality of heating elements 18, addressing electrodes 17, and return electrodes 21 (not shown). Terminal 32 of the addressing electrode is near any of the edges of the heater plate except edge 26 which is coplanar with edge 29 of channel plate 31. Opening 25 enables means for maintaining the manifold 20 full of pressurized ink (not shown). The channel 22 is about the same length and width as the heating element or resistor 18, and its length (i.e, the direction parallel to the ink flow) may be even shorter than that of the heating element. The channel length is generally in the range of 0.5 to 10 mils (12.5 to 250 microns). The advantage of this configuration is in avoiding the problem of excessive pressure drop across the channels because they are very short. Also, the short channels are less easily clogged by the ink agglomerates or contamination. The distances of the resistor to the orifice may be optimally placed upstream of but near the orifices because the common electrode used in conventional thermal ink jet printers is not required. In the embodiment of FIG. 2, the aluminum electrodes at the point of contact with the heating element tends to disrupt the flow pattern of the ink because the heating element is effectively recessed relative to the aluminum addressing electrodes and return electrodes. This is because the electrodes overlap the edges of the resistor. This slightly recessed heater, contrary to the thermal ink jet dropon-demand operation, causes significant inefficiency in the continuous stream type ink jet printer. Another problem to be overcome is the length of the resistor. Since the wavelength λ of the perturbed ink stream must be equal to or greater than the length of the resistor, this forces high λ divided by the effective channel or nozzle diameters if the stream diameter is to be small. The length of the heated volume of the ink stream is longer than the heater length since the fluid moves during the heat pulse. If the stream's velocity is ten meters per second, the heater length is 100 microns, and the heat pulse is five microseconds, the heated area length is increased by 50 microns so the total heated area would be about 150 microns long. For typical continuous stream type applications, the resistor should be as wide as the channel to maximize heated volume, but as short as possible in the channel length direction to make the heat pulse as short as possible. This would allow shorter wavelengths, thus lower λ over nozzle diameter ratios even when the diameter is small.

The advantages of the configuration shown in FIG. 4 is that the heater can be placed a few microns upstream from the channel orifice, the channels may be very short, the aluminum contacts are not in the channel, the heating elements are not effectively recessed, and the heater has a maximized width and minimized length.

Figure 5:
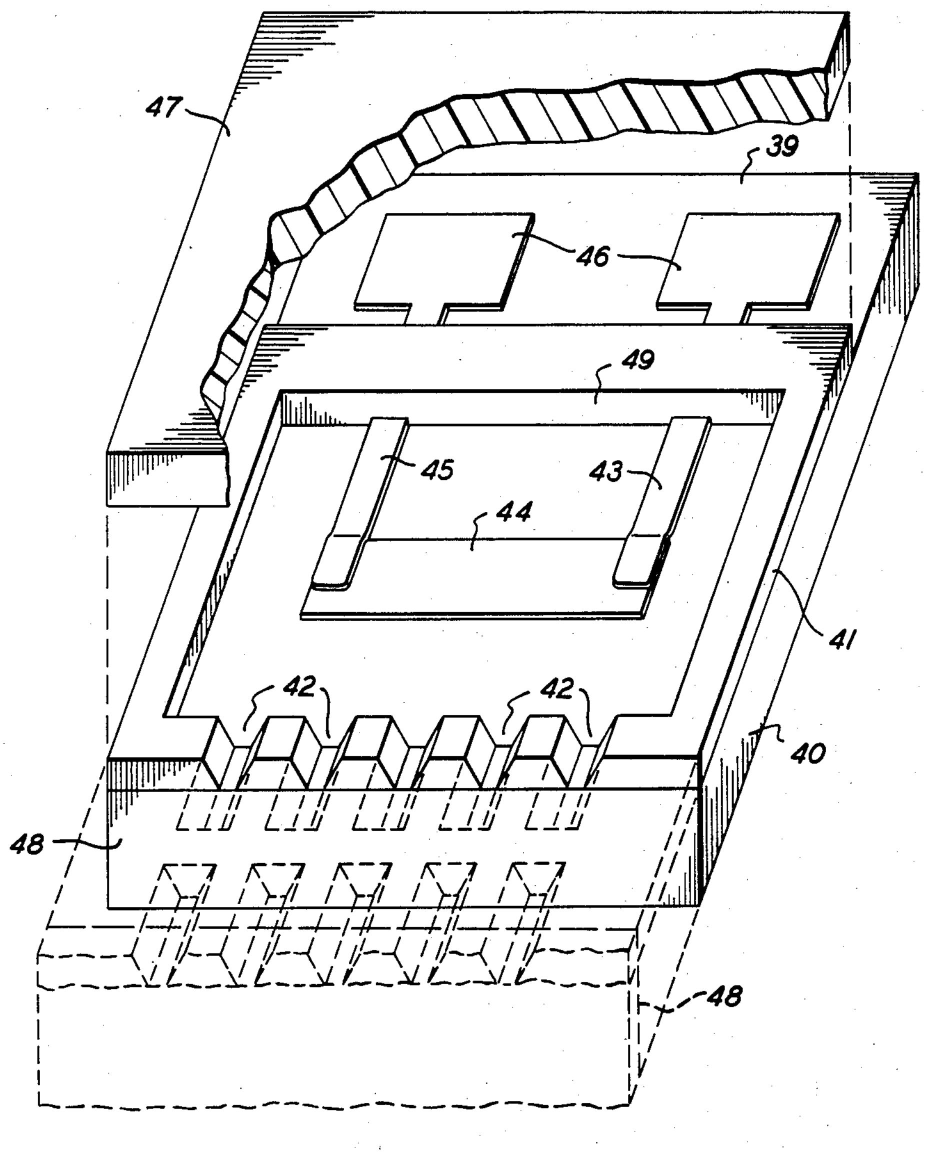
FIG. 5 is a schematic isometric view of another embodiment of the printhead of the present invention with the covering substrate raised and partially removed.

FIG. 5 is an alternate embodiment of the present invention shown in isometric view with the top plate or roof 47 raised and partially shown to better show the inventive features of this embodiment. The heater plate or substrate 40 has patterned thereon a single resistor 44 for thermally pulsing the ink in the manifold 49. Addressing electrode 45 and return electrode 43 have terminals 46 near the end of the heater plate opposite the ink channels. The channel plate is depicted as an intermediate layer which may be either etched silicon or patterned photosensitive material. For ease of construction, at least pairs of heater plate 40 and channel plate 41 (part of one shown is in dashed line) are bonded together and diced along planes 48 to separate the printheads and to open concurrently the channels and form the orifices. Top plate or roof 47 is then bonded over the channel plate to produce manifold 49 housing the resistor 44. The ink channels are formed by openings 42 in the channel plate which is sandwiched between the roof and heater plate. The added advantage of the embodiment of FIG. 5 over the other embodiments is the simplicity of the design, namely, one resistor per array of channels and freedom from the constraints of fabricating printheads with individual thermal transducers for each channel. For example, in the fabrication of the printhead embodiments in FIGS. 1–4, individual heater elements must be critically aligned to each ink channel. In the configuration of FIG. 5, the alignment of a single large resistor to the ink channels or manifold would be very non-critical. The lengths of the channels 42 are very short, such as in the range of 0.5 to 10 mils (12.5 to 250 microns).

In the continuous stream ink jet printing system wherein only neutral charged droplets are printed and all charged droplets are guttered, the printhead is generally fixed and the recording medium is moved at a constant velocity thereby. In some configurations, the printhead is above and perpendicular to the moving recording medium so that gravity assists the droplets to be printed. Continuous stream ink jet printing systems which print only neutrally charged ink droplets require one nozzle for each pixel in the line of pixels that form the printed lines on the recording medium. Therefore, as in the typical thermal drop-on-demand ink jet printer, the printing resolution or number of spots or pixels per inch printed are directly proportional to the nozzle spacing. The most cost effective manner to provide such a continuous stream ink jet printing system having high resolution printing capability is through the use of the embodiments shown in FIGS. 1 through 5. No other configuration and manufacturing technique can provide a printhead having such high nozzle density at such low cost. Nozzle densities or spacings are readily achieved in the 300 to 600 nozzles per inch range, with even higher nozzle densities possible.

Figure 6:
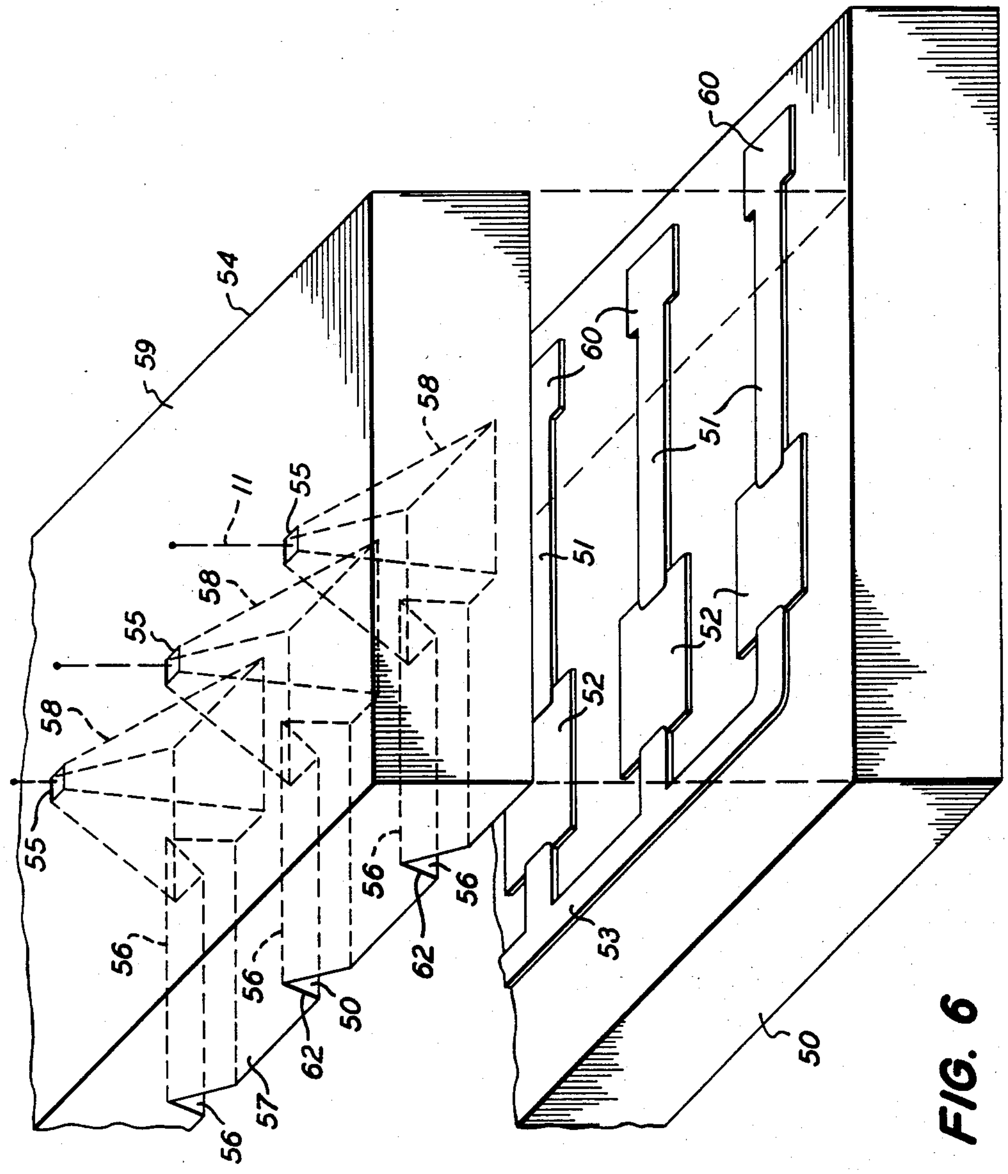
FIG. 6 is a further embodiment of the present invention schematically shown in isometric view with the channel plate and heater plate separated for clarity.

FIG. 6 is another embodiment of the present invention where the channel plate 54 is shown separated from the heater plate 50 for better viewing of these parts. A plurality of nozzles 55 is provided by the opening through etch pits in a (100) silicon wafer. By patterning a photosensitive material placed on the wafer and anisotropic etching of individual manifolds 58, the manifolds are etched through the channel plate and terminate in rectangular or square openings or nozzles 55 in surface 59 of the nozzle plate 54. The grooves 56 could be diced (not shown) or they could be anisotropically etched concurrently with the manifolds 58 and in a manner taught in the patent application to Hawkins et al followed by isotropic etching to open each channel 56 into its respective manifold 58. The etching could be accomplished in a manner so as to leave the openings in surface 59 of a size approximately one mil square or a nozzle plate (not shown) could be bonded to it later having the appropriate nozzle dimension. Heater plate 50 has heaters 52 with addressing electrodes 51 and common return 53. The addressing electrodes have terminals 60 which are located at one edge of the heater plate, well beyond the nozzle plate for ease of subsequent electrical connection. Nozzle plate 54 and heater plate 50 are then aligned and bonded together with a heater 52 directly below each nozzle 55 in what is generally termed by those skilled in the art as a "roof-shooter" configuration. A pressurized ink supply (not shown) is provided to the openings 62 in any well known manner such as by individual tubes (not shown) or by bonding a common manifold thereto (not shown). The pressurized ink flows through the nozzles 55 in a direction perpendicular to the heating elements 52 as depicted by dashed line 11.

Figure 7:
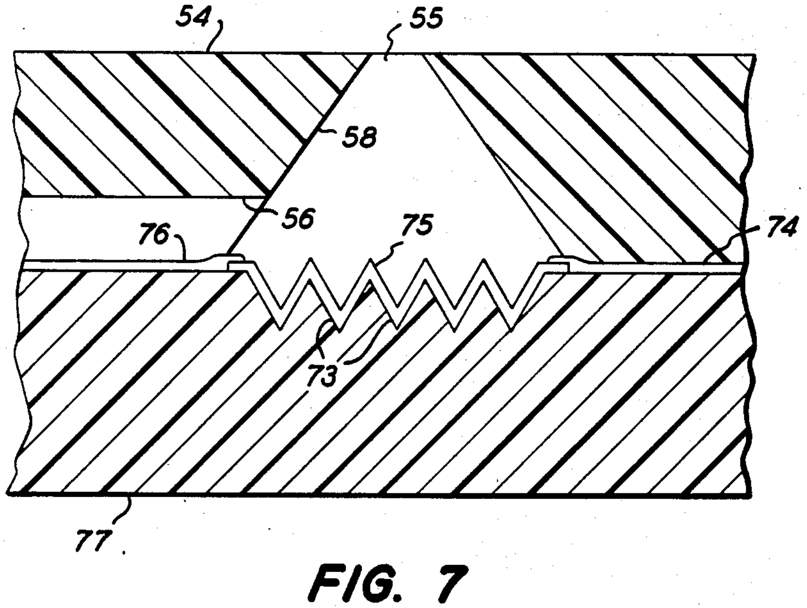
FIG. 7 is an alternate embodiment of FIG. 6 showing a means for increasing the surface area of the heating element.

FIG. 7 shows yet a further configuration for the heater or heating elements 75. In this embodiment, the heating elements 75 is formed over small grooves 73 in the heater plate 77 which will provide increased surface area for the heating element, allowing yet a further reduction in the power required to thermally pulse the ink in the individual manifolds 58.

To exaggerate the effect of viscosity modulation, the ink could contain a significant amount of an ingredient with a strongly temperature sensitive viscosity. Such chemicals are common. For instance, the viscosity of ethylene glycol and its polymers changes by a factor of 2 for roughly 32 degrees temperature change. In fact, it is necessary to regulate ink temperature to stabilize ink stream velocity in conventional continuous stream type ink jet printers. The case of ethylene glycol is typical of a fluid with strong hydrogen bonding. A more severe case would be one of a working fluid or ink that had a structural transition near room temperature.

Of course, actual bubble generation could be a major perturbation of the ink jet stream and should easily produce stable drop generation as disclosed in U.K. Pat. No. 2,060,499. However, at the current state of the art, heater lifetimes are adversely affected by cavitational damage resulting from collapse of the bubbles. Although the lifetime is adequate for drop-on-demand applications, it is not adequate for high frequency continuous stream type applications. If advances in heater design or materials are realized, bubble drive may be more feasible.

The advantages of non-vaporization thermal perturbation of the ink in a continuous stream type ink jet printers are:

1. Operating frequency can be higher than drop-on-demand bubble jet in which the dominant limitation is the time required for ink refill. Also, heater cooling after each pulse is facilitated by the moving ink.

2. Fabrication of the entire structure can be done using silicon wafer batch processing as disclosed in the patent application to Hawkins et al. This allows high precision fabrication at low cost. Actually, all of the key elements (reservoir, channels, and heaters) have already been demonstrated and work on the thermal ink jet printers disclosed in the Hawkins et al patent application.

3. Uniform jet breakoff length is achievable because of the good uniformity of heater resistors and the fact that the ink streams are thermally driven rather than driven by a common wave that inter-reacts with an acoustic reservoir. In addition, if non-uniformities are found to occur in the array due to crosstalk, each individual resistor in the array can be tailored in design to give the appropriate drive for uniform breakoff, or the power delivered to each separate resistor can be tailored.

4. The droplet break off phase of each ink stream of jet is identical because the local perturbation of each jet is simultaneous with that of each of the other jets in the array because the current pulses to each resistor is derived from a single supply.

5. Size and weight of the drop generator should be greatly reduced, since the fabrication material is silicon and a large acoustic reservoir is not needed.

6. Since a large acoustic reservoir is not needed, and since the drive resistors can be placed close to the nozzle exit, start-up is less troublesome, especially for the configurations where the resistors are close to each of the nozzles but spaced upstream therefrom, whereby initial droplet ejection could be accomplished by the typical bubble jet drop-ondemand mode followed by continuous stream operation with the current to the resistors reduced to prevent vaporization of the ink.

Many modifications and variations are apparent from the foregoing description of the invention and all such modifications and variations are intended to be within the scope of the present invention.

We claim:

1. In a continuous stream ink jet printer of the type having a printhead with a manifold for containing a replenishable supply of ink, a plurality of orifices, and individual channels connecting the orifices to the manifold for providing ink flow paths therebetween, the printhead comprising:

a first substrate having one edge and having on one surface thereof at least one heating element and addressing electrodes for providing current pulses thereto;

a second substrate having one edge and containing a recess and a plurality of parallel grooves in one surface thereof, one end of the grooves extending through the edge of the second substrate and the other end opening into the recess;

the first and second substrates being mated and permanently bonded together, so that their respective edges lie in the same plane and the recess and grooves are closed by the first substrate to produce the manifold and channels, respectively, with said at least one heating element contactable by the ink, the channel groove ends that penetrate the second substrate edges serving as the orifices;

means to continually supply pressurized ink to the manifold; and circuit means to provide said at least one heating element with a continual series of current pulses via the addressing electrodes at a predetermined frequency and power, so that the ink contacting the at least one heating element during the application of thermal pulses sustains a constant uniform change in the density, viscosity, or surface tension of the ink because of a fluctuation in temperature without the temperature of the ink being raised to a level that would vaporize or produce a change of state therein.

2. The printhead of claim 1, wherein the at least one heating element is a single heating element located in the printhead manifold; and wherein the channel lengths are minimized to reduce the pressure drops thereacross.

3. The printhead of claim 1 wherein the at least one heating element is a set of commonly energized heating elements, one heating element being located in each channel in the vicinity, but upstream of the orifice.

4. The printhead of claim 3, wherein the addressing electrodes comprise a single passivated addressing electrode located within each channel and a passivated common return electrode located between the heating elements and the orifices.

5. The printhead of claim 3, wherein the addressing electrodes comprise an individual addressing electrode and an individual return electrode for each heating element; wherein the heating elements are adjacent the orficies and have the same length and width as the channel; and wherein neither the addressing electrodes or return electrodes are within the channels.

6. The printhead of claim 5, wherein the length of the channels is in the range of 0.55 to 10 mils (12.5 to 250 microns), so that the relatively short channels produce a minimum pressure drop thereacross.

7. The printhead of claim 1, wherein the first and second substrates are silicon.

8. The printhead of claim 1, wherein the second substrate comprises a layer of photosensitive material deposited on the first substrate that is patterned to provide the channels and reservoir by the removal of the patterned area, and a solid cover that is bonded over the patterned photosensitive layer, so that the channels are reservoir are provided within the printhead by the sandwiching of the photosensitive layer between the first substrate and the cover,the patterned channels and reservoir being appropriately aligned with the at least one heating element.

9. A continuous stream ink jet printer having a printhead comprising:

a first silicon substrate having one edge and one surface, the first substrate surface having deposited thereon a plurality of heating elements with each having an individual addressing electrode and a return electrode;

a second silicon substrate having first and second, parallel opposing surfaces and at least one edge therebetween, the first surface of the second substrate having an isotropically etched therein a plurality of parallel grooves and through holes, the grooves having a triangular cross section, with each having an associated through hole having pyramidal volumetric shape with its apex being approximately a square opening in the second surface of the second substrate, one end of the grooves being opened into its associated through hole and the other end being opened through its edge;

the first and second substrates being aligned and bonded together, so that one heating element lies at the base of each of the pyramidally shaped through holes, the edges of the first and second substrates being coplanar, so that the grooves are closed to form channels from the through holes to the coplanar edges;

means for providing pressurized ink to each of the channel openings in the coplanar edges, the ink entering said channel openings and flowing from the square openings in the second substrate second surface; and circuit means to provide a continual series of current pulses concurrently to the heating elements via their addressing electrodes, the current pulses having a predetermined frequency and power, so that the ink contacting the heating elements during the application of the current pulses receives thermal energy pulses which imposes a constant cyclic uniform change in the density, viscosity, or surface tension of the ink because of a fluctuation in temperature without incurring a change of state or vaporization.

10. The printhead of claim 9, wherein the surface region of each first substrate having the heating elements deposited thereon is grooves to increase the surface area of each heating element.

11. In a continuous stream ink jet printer of the type having a printhead with a plurality of orifices which emit ink streams therefrom toward a recording medium, a plurality of charging electrodes positioned at the location where the ink streams break up into droplets, a gutter, deflection electrodes, and means to apply a voltage to each charging electrode in response to binary print and no print signals, so that only neutrally charged droplets are printed and all charged droplets are directed to the gutter for collection and reuse, the printhead comprising:

a first substrate having one edge and having on one surface thereof a plurality of heating elements, each having an addressing electrode for providing current pulses concurrently thereto;

a second substrate having one edge and containing a recess and a plurality of parallel grooves in one surface thereof, one end of the grooves extending through the edge of the second substrate and the other end opening into the recess;

the first and second substrates being mated and permanently bonded together, so that their respective edges lie in the same plane with the recess and grooves being closed by the first substrate to produce the manifold and channels, respectively, and with one heating element lying in each channel, the channel groove ends that penetrate the second substrate edges serving as the orifices, each heating element being closely adjacent, but upstream of its orifice and being contactable by the ink flowing thereby as the ink exits from said orifices;

means to continually supply pressurized ink to the manifold; and circuit means to provide said heating elements with a concurrently continual series of current pulses via the addressing electrodes at a predetermined frequency and power to perturbate the ink, whereby the ink contacting the heating elements during the application of thermal pulses sustains a constant uniform change in the density, viscosity, or surface tension of the ink because of a fluctuation in temperature without the temperature of the ink being raised to a level that would vaporize or produce a change of state therein.

* * * * *